(12) United States Patent
Noguchi

(10) Patent No.: US 8,355,175 B2
(45) Date of Patent: Jan. 15, 2013

(54) IMAGE FORMING APPARATUS CAPABLE OF REPRODUCING FINE LINE OF HIGH QUALITY

(75) Inventor: Kazuyoshi Noguchi, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1367 days.

(21) Appl. No.: 11/723,943

(22) Filed: Mar. 22, 2007

(65) Prior Publication Data

US 2008/0123141 A1 May 29, 2008

(30) Foreign Application Priority Data

Nov. 29, 2006 (JP) .................................. 2006-321871

(51) Int. Cl.
*G06K 15/00* (2006.01)

(52) U.S. Cl. ............ 358/2.1; 358/1.1; 358/1.9; 382/167; 382/173; 382/176

(58) Field of Classification Search .................. 358/1.1, 358/1.9, 2.1; 382/167, 173, 176
See application file for complete search history.

(56) References Cited

U.S. PATENT DOCUMENTS

| | | | | |
|---|---|---|---|---|
| 5,473,734 A | * | 12/1995 | Maskell et al. ................. | 358/1.9 |
| 5,862,257 A | | 1/1999 | Sekine et al. | |
| 6,067,377 A | * | 5/2000 | Hata .............................. | 382/167 |
| 6,167,166 A | | 12/2000 | Loce et al. | |
| 6,233,000 B1 | | 5/2001 | Obata et al. | |
| 6,690,486 B1 | | 2/2004 | Ogoh et al. | |
| 6,834,124 B1 | | 12/2004 | Lin et al. | |
| 7,751,082 B2 | * | 7/2010 | Otake et al. .................... | 358/1.9 |
| 2003/0117655 A1 | | 6/2003 | Ito | |

FOREIGN PATENT DOCUMENTS

| | | |
|---|---|---|
| EP | 0 662 765 | 7/1995 |
| JP | 6-030267 A | 2/1994 |
| JP | 2000-036912 | 2/2000 |
| JP | 2004-355011 | 12/2004 |
| JP | 2006-180380 | 7/2006 |

OTHER PUBLICATIONS

Notice of Grounds of Rejection issued in the corresponding Japanese Patent Application No. 2009-003825 dated Apr. 13, 2010, and an English Transaltion thereof.
European Search Report dated May 30, 2007.

* cited by examiner

*Primary Examiner* — King Poon
*Assistant Examiner* — Lawrence Wills
(74) *Attorney, Agent, or Firm* — Buchanan Ingersoll & Rooney PC

(57) ABSTRACT

In an image forming apparatus, a line width detection unit detects a line width from attribute data inputted from an attribute data input unit, an edge detection unit detects an edge from image data inputted from an image data input unit, and an AND calculation unit calculates an AND of results of these detections. A coefficient storage unit stores a coefficient set for each line width. A line width correction coefficient multiplication unit acquires a correction coefficient corresponding to the detected line width with regard to an edge and the detected pixel and performs a multiplication to thereby correct the line width.

21 Claims, 11 Drawing Sheets

| LINE WIDTH(dot) | LINE WIDTH CORRECTION COEFFICIENT |
|---|---|
| 1 | 0.1 |
| 2 | 0.2 |
| ⋮ | ⋮ |
| N | 0.8 |

| LINE WIDTH (dot) | LINE WIDTH CORRECTION COEFFICIENT | | | |
|---|---|---|---|---|
| | K | Y | M | C |
| 1 | 0.10 | 0.70 | 0.40 | 0.30 |
| 2 | 0.20 | 0.72 | 0.45 | 0.34 |
| ⋮ | ⋮ | ⋮ | ⋮ | ⋮ |
| N | 0.80 | 1.00 | 0.90 | 0.85 |

IMAGE FORMING APPARATUS CAPABLE OF REPRODUCING FINE LINE OF HIGH QUALITY

This application is based on Japanese Patent Application No. 2006-321871 filed with the Japan Patent Office on Nov. 29, 2006, the entire content of which is hereby incorporated by reference.

BACKGROUND OF THE INVENTION

1. Field of the Invention

The present invention relates to an image forming apparatus, a line width control method and a line width control program product embodied in a computer readable medium. In particular, the present invention relates to an image forming apparatus, a line width control method and a line width control program product embodied in a computer readable medium each capable of reproducing a fine line of high quality.

2. Description of the Related Art

In a case that an image input apparatus such as a facsimile moves an original draft to read an image thereof, even when fine lines having a single width are read, those in a main scanning direction (lateral fine lines) are higher in output than those in a sub-scanning direction (vertical fine lines). Therefore, the fine lines in the sub-scanning direction are not corrected so much as compared with the fine lines in the main scanning direction. As a result, the lateral fine lines corresponding to the sub-scanning direction are degraded in image quality, for example, the lateral fine lines are patchy.

In order to overcome this problem, Japanese Laid-Open Patent Publication No. 06-030267 (hereinafter, referred to as Patent Document 1) proposes an image reading apparatus capable of preventing patchy lateral fine lines and achieving improved image quality. According to this image reading apparatus, in a case that a lateral fine line minimum output is higher than a vertical fine line minimum output with regard to minimum output characteristics for a line width in an image input unit, a weight coefficient for a pixel in a sub-scanning direction is made larger than a weight coefficient for a pixel in a main scanning direction by an MFT correction in an image processing unit. Thus, a lateral fine line is prevented from being patchy upon read of an image.

However, even in image data inputted as described above, when a font is printed by an image forming apparatus such as an MP (Multi Function Peripheral), a dot tends to be expanded depending on performance of an engine. As a result, there arises a problem that reproducibility of a fine line is degraded.

When reproducibility of a fine line is degraded, the fine line can not be reproduced, so that there arises a problem that a type of a font can not be identified. In addition, the fine line is not outputted as a fine line, so that there arises a problem that an outputted image is degraded in quality. There also arises a problem that a font having a small size can not be identified.

SUMMARY OF THE INVENTION

The present invention is devised in view of the aforementioned problems. An object of the present invention is to provide an image forming apparatus, a line width control method and a line width control program product embodied in a computer readable medium each capable of forming an image of high quality by enhancing reproducibility of a fine line.

In order to accomplish this object, according to one aspect of the present invention, an image forming apparatus includes a line width detection unit for detecting a width of a line contained in image data from attribute data corresponding to the image data, an edge detection unit for detecting an edge pixel from the image data, a storage unit for storing a line width correction coefficient corresponding to a line width, and a correction unit for acquiring a line width correction coefficient corresponding to the line width detected by the line width detection unit from the storage unit with regard to the edge pixel, and correcting a gradation of the edge pixel through the use of the line width and the line width correction coefficient, thereby correcting the line width.

According to another aspect of the present invention, a line width control method is a method for controlling a width of a line contained in an image formed by an image forming apparatus. The image forming apparatus includes a storage unit for storing a line width correction coefficient corresponding to a line width. The line width control method includes an acquisition step of acquiring image data and attribute data corresponding to the image data in the image forming apparatus, a line width detection step of detecting a width of a line contained in the image data from the attribute data, an edge detection step of detecting an edge pixel from the image data, and a correction step of acquiring a line width correction coefficient, corresponding to the line width detected in the line width detection step, from the storage unit with regard to the edge pixel, and correcting a gradation of the edge pixel through the use of the line width and the line width correction coefficient, thereby correcting the line width.

According to still another aspect of the present invention, a line width control program product embodied in a computer readable medium is a program product for allowing a computer to execute processing for controlling a width of a line contained in an image formed by an image forming apparatus. The line width control program product embodied in a computer readable medium includes an acquisition step of acquiring image data and attribute data corresponding to the image data in the image forming apparatus, a line width detection step of detecting a width of a line contained in the image data from the attribute data, an edge detection step of detecting an edge pixel from the image data, and a correction step of acquiring a line width correction coefficient, corresponding to the line width detected in the line width detection step, from a storage unit for storing a line width correction coefficient corresponding to a line width, with regard to the edge pixel, and correcting a gradation of the edge pixel through the use of the line width and the line width correction coefficient, thereby correcting the line width.

According to the present invention, an image forming apparatus configured as described above makes it possible to reproduce a fine line irrespective of characteristics of an engine upon formation of an image. Thus, it is possible to enhance reproducibility of a font in a formed image. Further, it is possible to enhance reproducibility of a fine ruled line. As a result, it is possible to form an image of high quality.

The foregoing and other objects, features, aspects and advantages of the present invention will become more apparent from the following detailed description of the present invention when taken in conjunction with the accompanying drawings.

Figure 2:
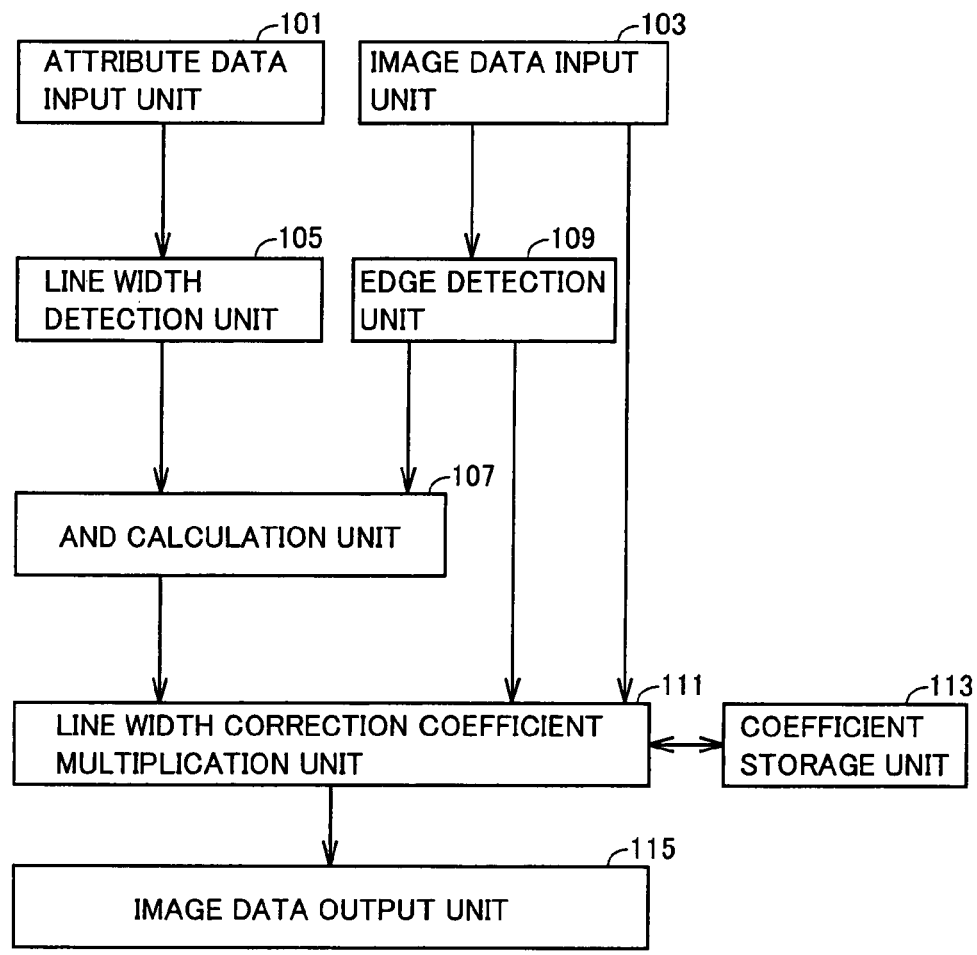

FIG. 2 is a block diagram showing a specific example of a functional configuration for performing line width control processing according to the embodiment, in image forming apparatus 1.

Figures 3, 4:
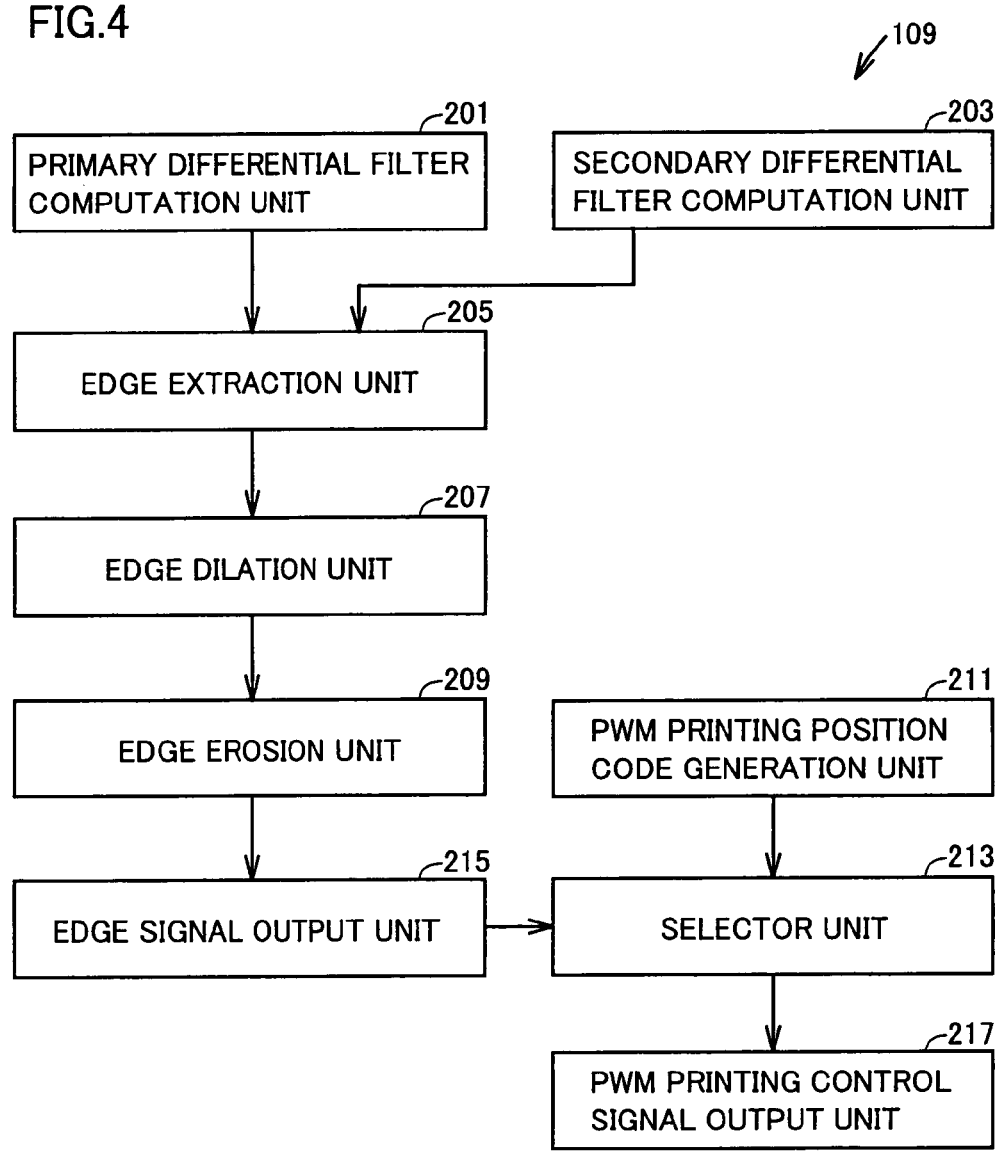

FIG. 3 shows a specific example of a line width correction coefficient stored in a coefficient storage unit 113.

FIG. 4 is a block diagram showing a specific example of a detailed configuration of an edge detection unit 109.

FIGS. 5-8 show a method for generating a PWM printing position code in a PWM printing position code generation unit 211.

Figure 9:
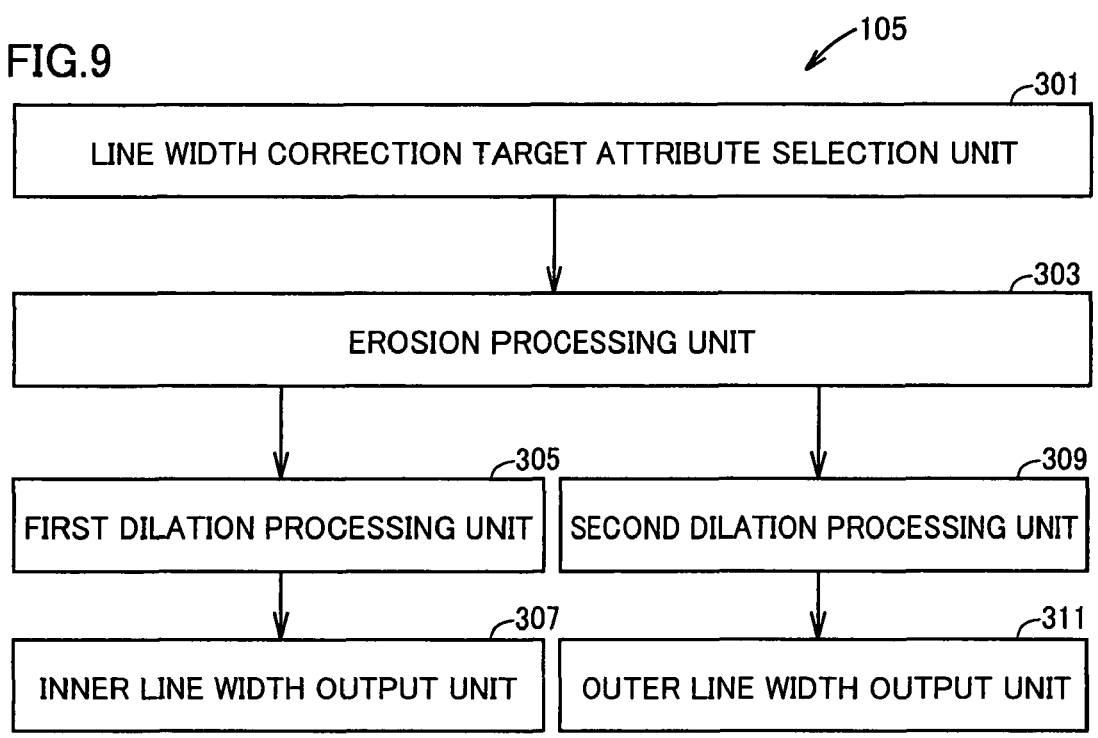

FIG. 9 is a block diagram showing a specific example of a detailed configuration of a line width detection unit 105.

Figure 10:
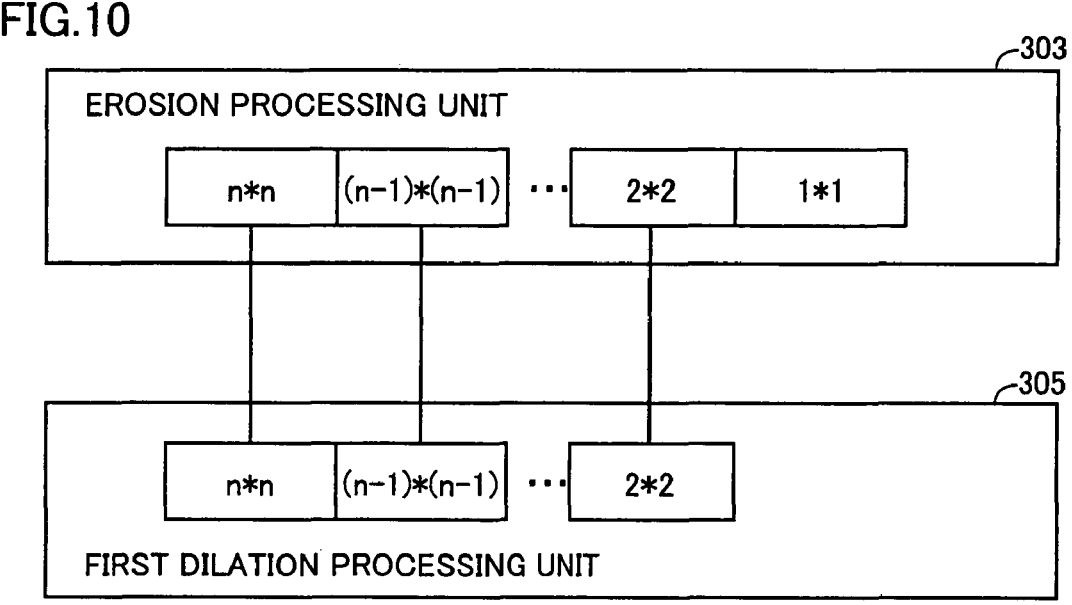

FIG. 10 shows first dilation processing.

Figure 11:
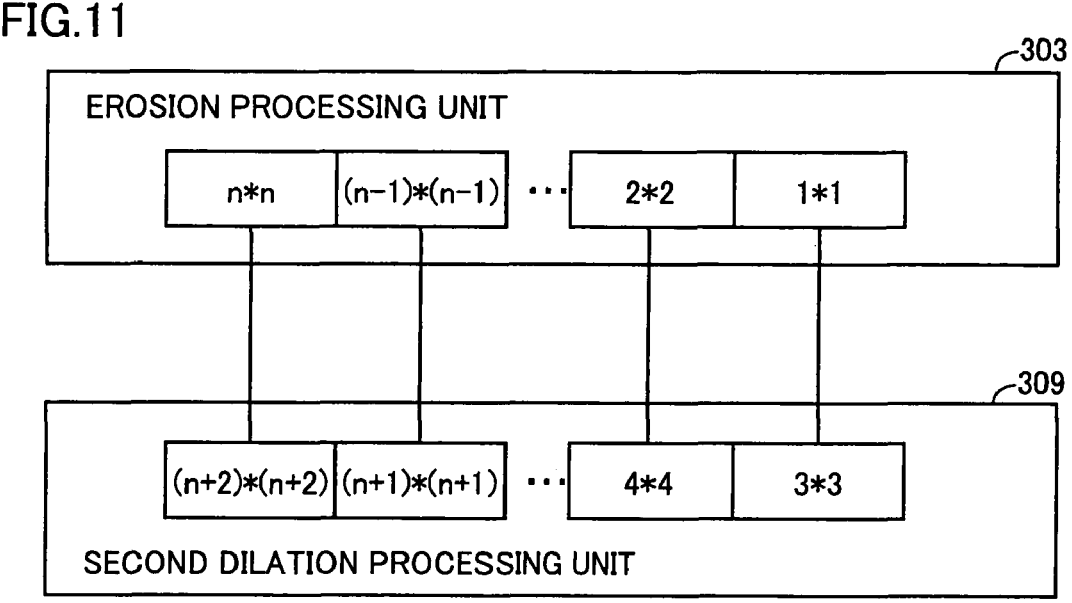

FIG. 11 shows second dilation processing.

Figure 12:
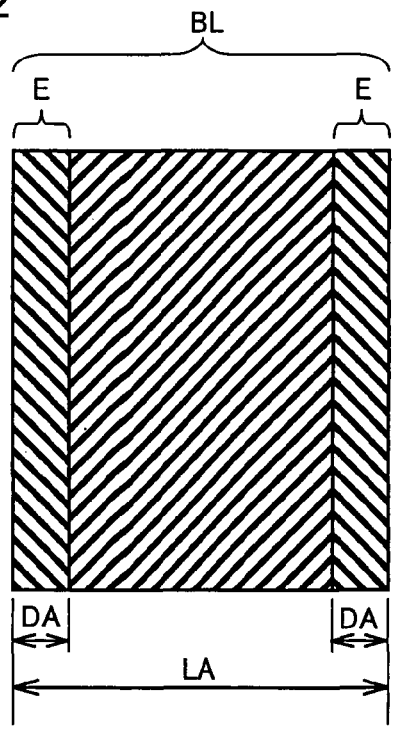

FIG. 12 shows an inner line width.

Figure 13:
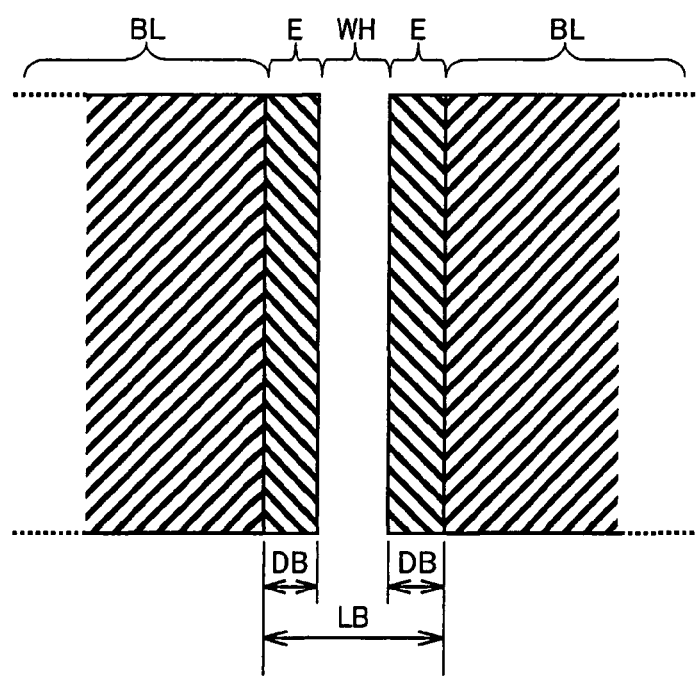

FIG. 13 shows an outer line width.

Figure 14:
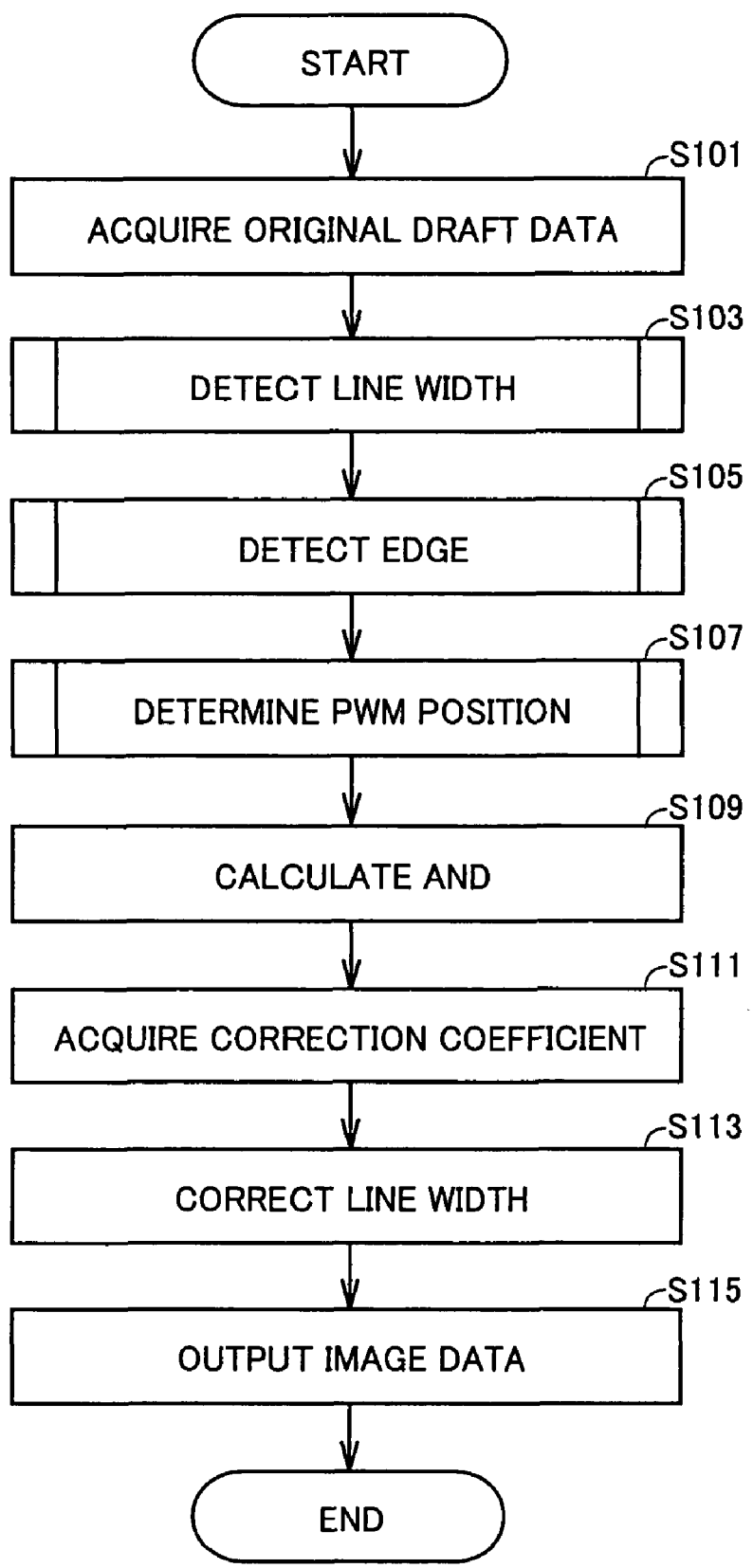

FIG. 14 is a flowchart showing a specific example of the line width control processing in image forming apparatus 1 according to the embodiment.

Figure 15:
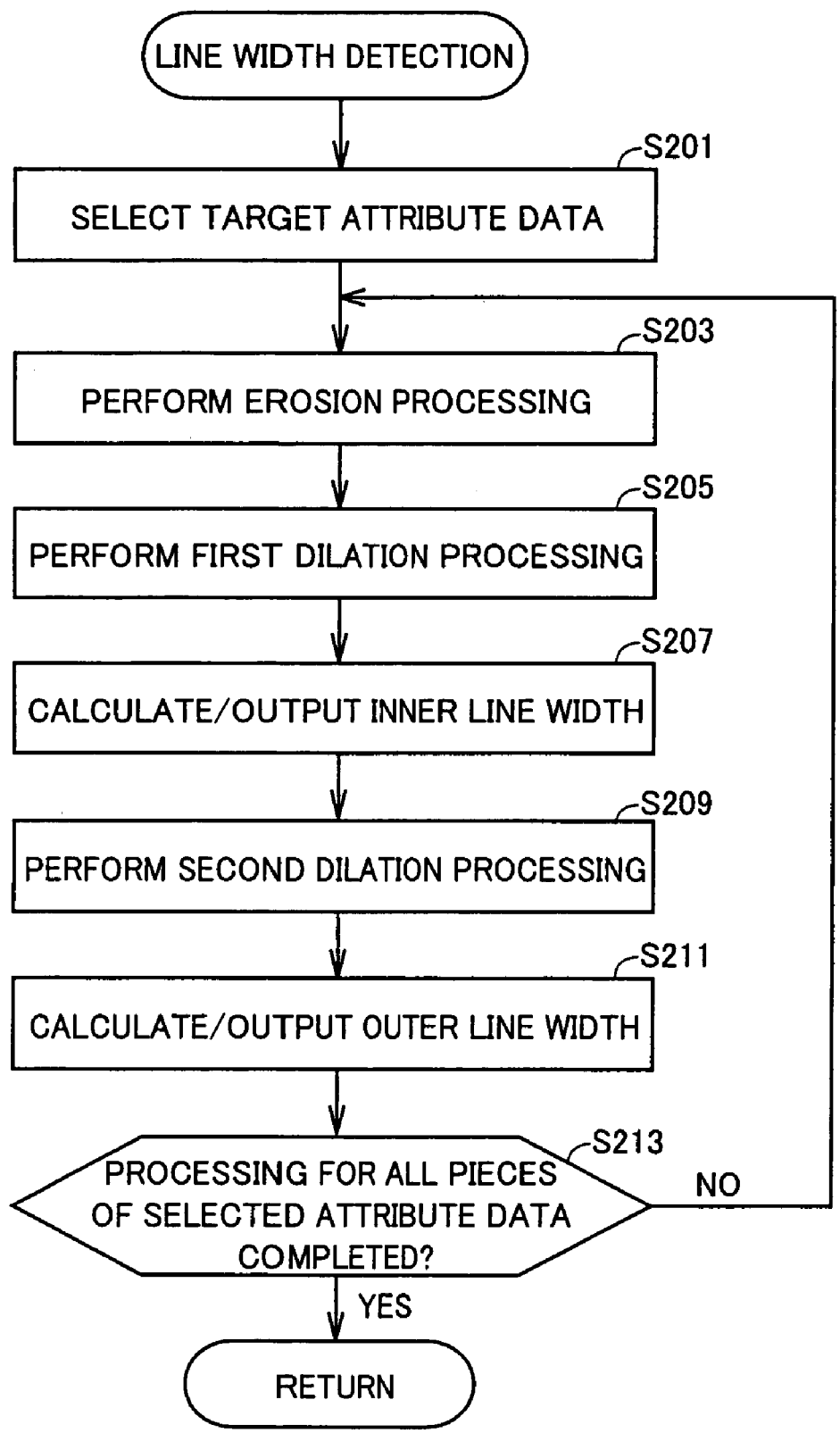

FIG. 15 is a flowchart showing line width detection processing in step S103.

Figure 16:
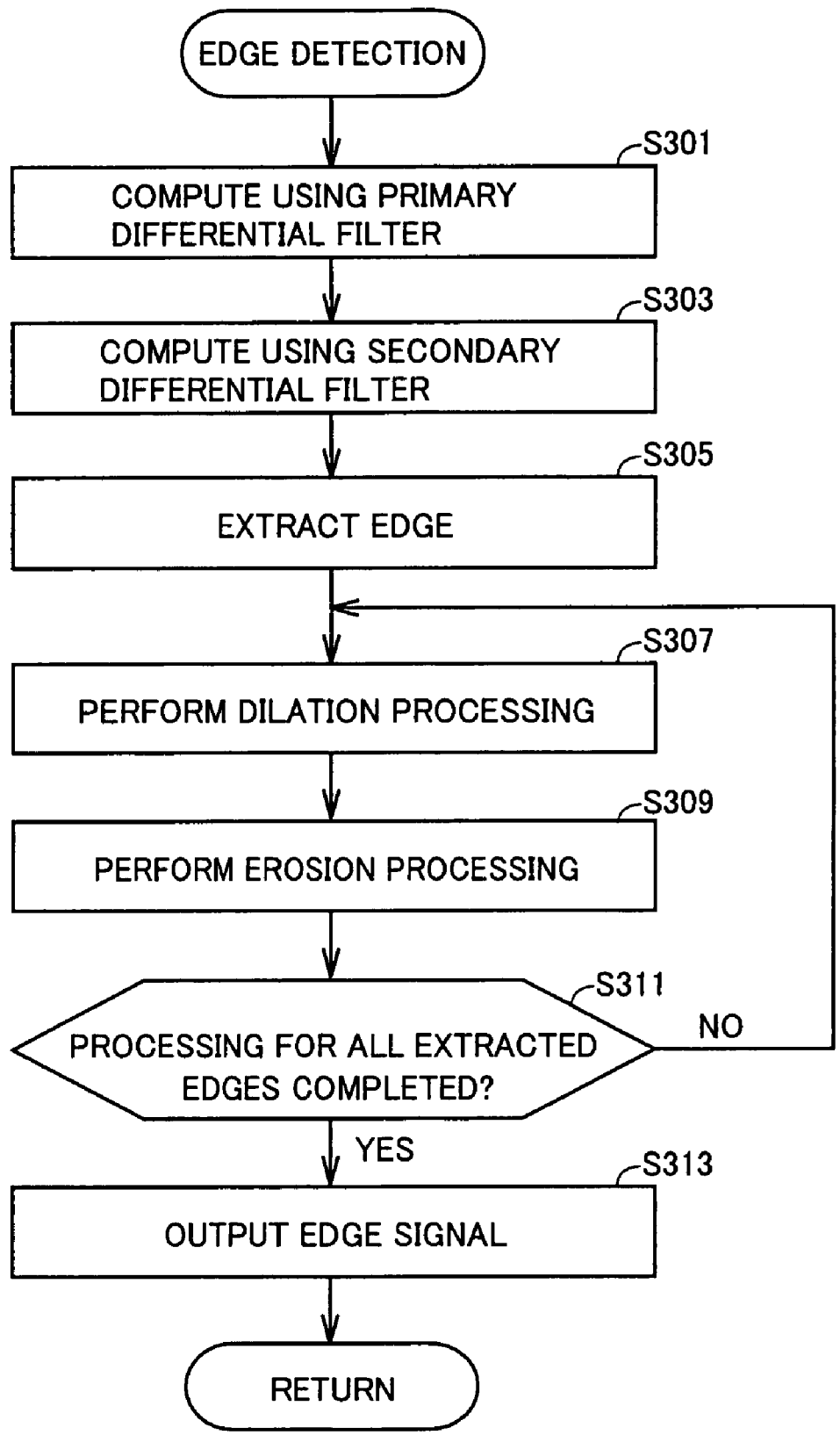

FIG. 16 is a flowchart showing edge detection processing in step S105.

Figure 17:
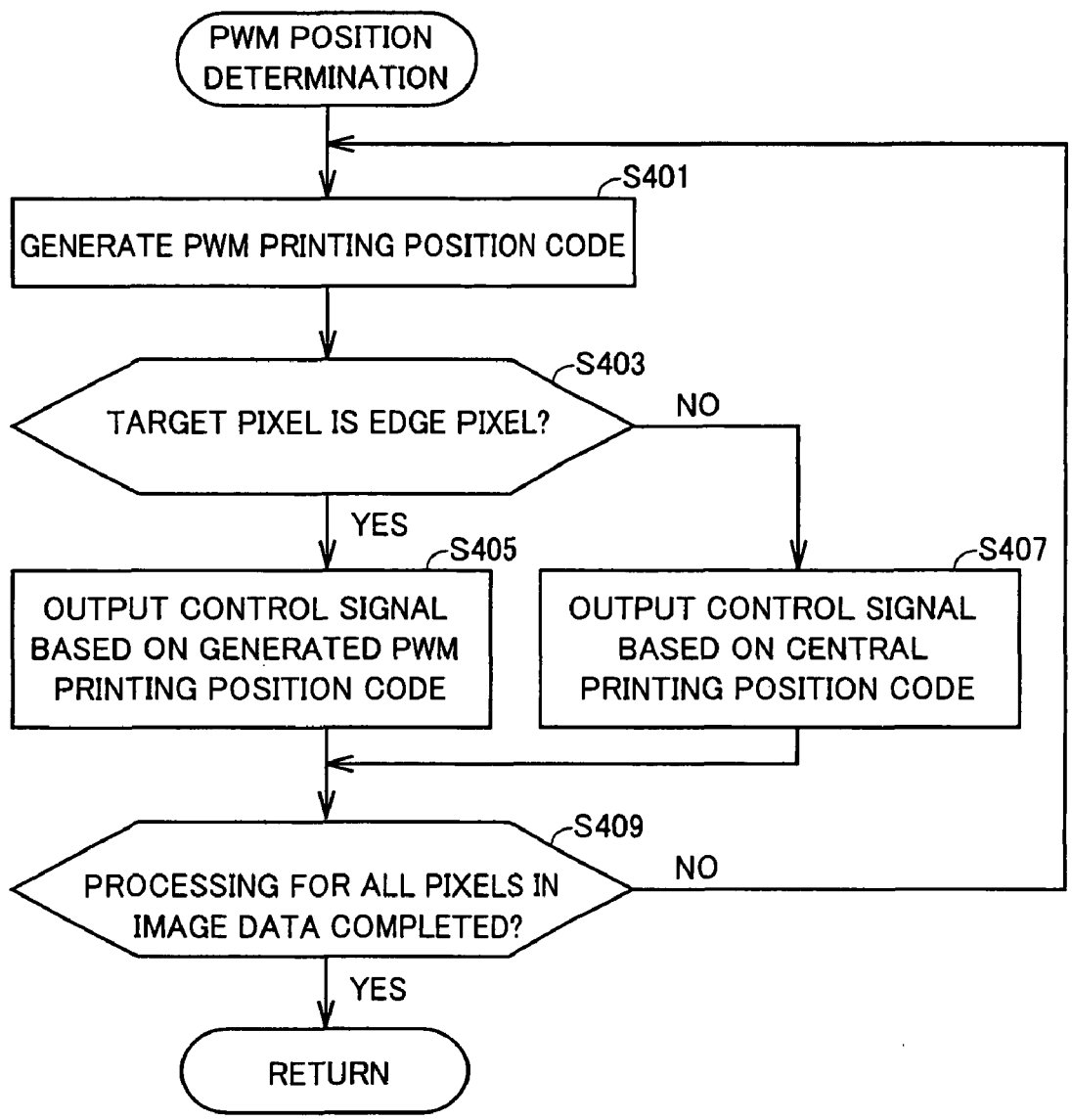

FIG. 17 is a flowchart showing PWM position determination processing in step S107.

Figures 18, 19:
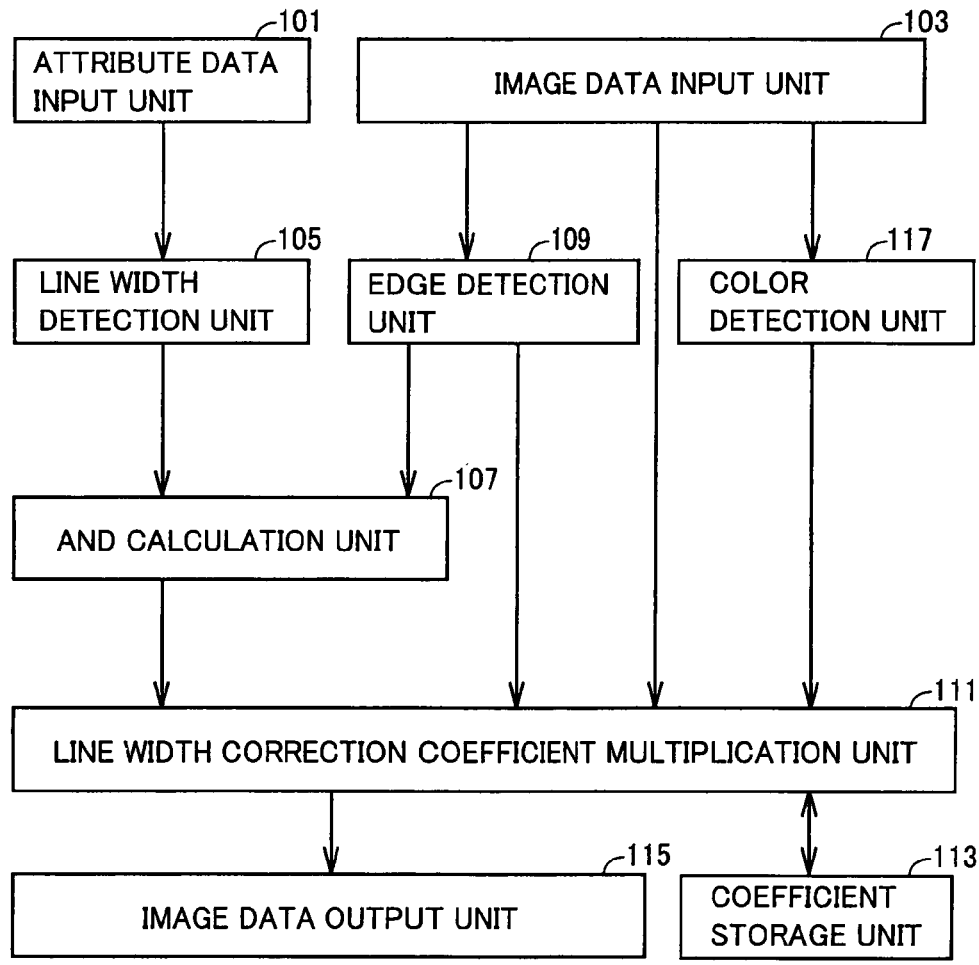

FIG. 18 is a block diagram showing a specific example of a functional configuration for performing the line width control processing according to the embodiment in an image forming apparatus 1 according to a first modification.

FIG. 19 shows a specific example of a line width correction coefficient stored in a coefficient storage unit 113 of image forming apparatus 1 according to the first modification.

DESCRIPTION OF THE PREFERRED EMBODIMENTS

With reference to the drawings, hereinafter, description will be given of an embodiment of the present invention. In the following description, identical components and constituent elements are denoted by identical reference numerals, and are provided with identical designations and functions.

Figure 1:
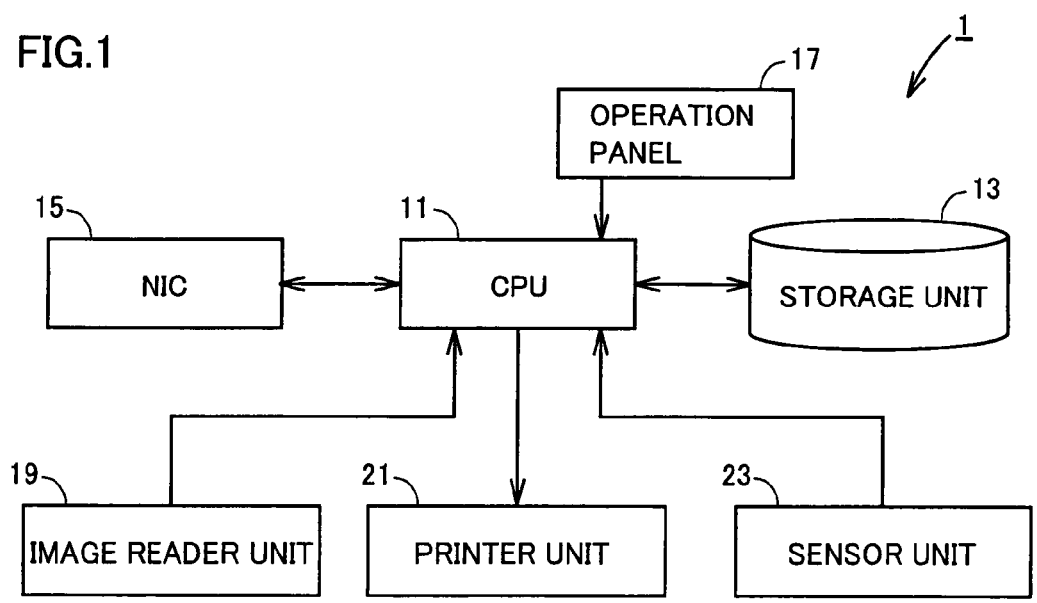
FIG. 1 is a block diagram showing a specific example of a hardware configuration of an image forming apparatus 1 according to an embodiment of the present invention in a case that image forming apparatus 1 is an MFP.

FIG. 1 is a block diagram showing a specific example of a hardware configuration of an image forming apparatus 1 according to the embodiment. Examples of image forming apparatus 1 include a copier, a printer, an MFP (Multi Function Peripheral) having a function as a copier and a function as a printer, and the like. It is assumed in the embodiment that image forming apparatus 1 is an MFP. 100311 With reference to FIG. 1, image forming apparatus 1 includes a CPU (Central Processing Unit) 11 controlling image forming apparatus 1 totally, an image reader unit 19 reading image data from an original draft, a printer unit 21 outputting an image to a sheet of paper, an NIC (Network Interface Card) 15 serving as an expansion card for connecting image forming apparatus 1 to a network or a telephone line and carrying out local radio communication, a storage unit 13, such as an HD (Hard Disk) or a RAM (Random Access Memory), storing a job and a program, such as a line width control program, executed by CPU 11, an operation panel 17 serving as an interface between image forming apparatus 1 and a user, and a sensor unit 23 detecting a remaining amount of a consumable article.

Image forming apparatus 1 acquires original draft data containing image data and attribute data, performs line width control processing (to be described later), and outputs the image data. The outputted image data is printed in image formation processing.

The image data contained in the original draft data acquired by image forming apparatus 1 is YMCK (Yellow Magenta Cyan Black) data or RGB (Red Green Blue) data. The attribute data indicates that each pixel in the image data is a text, a graphic or neither the text nor the graphic. The attribute data is added by an image creation application operated in a terminal such as a PC (Personal Computer) and, then, is transmitted to image forming apparatus 1 in some cases. Alternatively, the attribute data is added by image forming apparatus 1 in such a manner that image data read by image reader unit 19 of image forming apparatus 1 is determined by an area determination unit (not shown) in some cases.

Functions shown in FIG. 2 are mainly realized in such a manner that CPU 11 executes programs stored in storage unit 13, but may be partially configured by hardware.

With reference to FIG. 2, the functions for performing the line width control processing in image forming apparatus 1 include an attribute data input unit 101 inputting attribute data of original draft data, an image data input unit 103 inputting image data of the original draft data, a line width detection unit 105 detecting a line width from the attribute data, an edge detection unit 109 detecting an edge from the image data, an AND calculation unit 107 calculating an AND of results of these detections, a coefficient storage unit 113 storing a coefficient for correcting the line width, a line width correction coefficient multiplication unit 111 performing a computation for correcting the line width, and an image data output unit 115 outputting image data having the corrected line width.

Line width detection unit 105 performs line width detection processing (to be described later), and inputs a line width signal indicating a detected line width to AND calculation unit 107. Edge detection unit 109 performs edge detection processing (to be described later), and inputs an edge detection signal indicating a detected edge to AND calculation unit 107. AND calculation unit 107 calculates an AND of these signals, and calculates an edge line width. An edge line width signal indicating the calculated edge line width is inputted to line width correction coefficient multiplication unit 111.

Further, edge detection unit 109 performs the edge detection processing (to be described later), and inputs a PWM (Pulse Width Modulation) position control signal indicating a PWM position (to be described later) to line width correction coefficient multiplication unit 111.

Coefficient storage unit 113 is mainly formed by a predetermined area in storage unit 13, and stores a line width correction coefficient used by line width correction coefficient multiplication unit 111. The line width correction coefficient is a coefficient set for each of a 1-dot line width to an n-dot line width and used for correcting a line width such that the line width becomes an ideal line width upon formation of an image.

As shown in FIG. 3, coefficient storage unit 113 stores a line width correction coefficient in correspondence with a line width. It is to be noted that a specific numeric value of a coefficient shown in FIG. 3 is merely a specific example; therefore, the present invention is not limited to this numeric value. The line width correction coefficient is a coefficient related to performance of an engine in an image forming apparatus as described above. Therefore, the line width correction coefficient is determined in correspondence with performance of an engine or is obtained from an experiment and the like. Hence, it is preferable that the line width correction coefficient is previously stored in coefficient storage unit 113. Alternatively, the line width correction coefficient may be changed or created by a user such as an administrator. In a case of changing or creating the line width correction coefficient, it is preferable that a screen therefor is displayed on operation panel 17 in order to accept input of a specific numeric value. Alternatively, it is preferable that a settable range is previously determined in accordance with performance of an engine and a numeric value selected within the range is accepted. It is also preferable that acceptance of a numeric value deviated from the settable range is refused.

Line width correction coefficient multiplication unit 111 performs processing for reading a line width correction coefficient corresponding to a line width from coefficient storage unit 113 on the basis of an edge line width signal inputted from AND calculation unit 107 and multiplying the line width by the coefficient, thereby correcting the line width. A result of the computation is inputted to image data output unit 115. Image data output unit 115 outputs image data having the corrected line width.

With reference to FIG. 4, edge detection unit 109 includes a primary differential filter computation unit 201 performing a primary differentiation on inputted image data through the use of a primary differential filter, a secondary differential filter computation unit 203 performing a secondary differentiation on inputted image data through the use of a secondary differential filter, an edge extraction unit 205 extracting a pixel, which is as an edge, on the basis of a result of these computations, an edge dilation unit 207 performing dilation processing on the pixel which is an edge, an edge erosion unit 209 performing erosion processing on a result of the processing, a PWM printing position code generation unit 211 generating a PWM printing position code for each pixel, a selector unit 213 selectively inputting a PWM printing position code, an edge signal output unit 215 outputting an edge signal on the basis of the PWM printing position code and a result of the erosion processing, and a PWM printing control signal output unit 217 outputting a PWM printing control signal on the basis of the PWM printing position code.

Edge extraction unit 205 calculates an AND of a result of the computation performed on the image data by primary differential filter computation unit 201 through the use of the primary differential filter and a result of the computation performed on the image data by secondary differential filter computation unit 203 through the use of the secondary differential filter, and extracts an edge from the image data. The extracted edge is inputted to edge dilation unit 207. A method for extracting an edge in edge extraction unit 205 is not particularly limited in the present invention, and a typical method may be adopted in the present invention.

Edge dilation unit 207 performs dilation processing on each edge inputted from edge extraction unit 205, and inputs a result of the processing to edge erosion unit 209. Edge erosion unit 209 performs erosion processing on each result of the dilation processing, and inputs a result of the processing to edge signal output unit 215. The dilation processing in edge dilation unit 207 and the erosion processing in edge erosion unit 209 are typical processing called open processing, and specific methods thereof are not particularly limited in the present invention.

Edge signal output unit 215 inputs an edge detection signal indicating a pixel which is an edge to each of AND calculation unit 107 and selector unit 213 on the basis of a result of the processing in edge erosion unit 209.

PWM printing position code generation unit 211 generates a PWM printing position code for determining a growth position of PWM with regard to each pixel in image data. Herein, the PWM printing position code corresponds to 2-bit data indicating a position, to which a pulse for dot printing is outputted, in one pixel if a gradation of a target pixel is smaller than a maximum value. That is, PWM printing position code generation unit 211 determines a position, at which dot printing is performed, in each pixel, in other words, determines a position and a direction, at and in which a dot printing portion is expanded, in one pixel. Herein, the term "a position and a direction, at and in which a dot printing portion is expanded, in one pixel" is referred to as "a growth position (or PWM position)", and a printing pulse for dot printing is outputted to the position.

Figure 5:
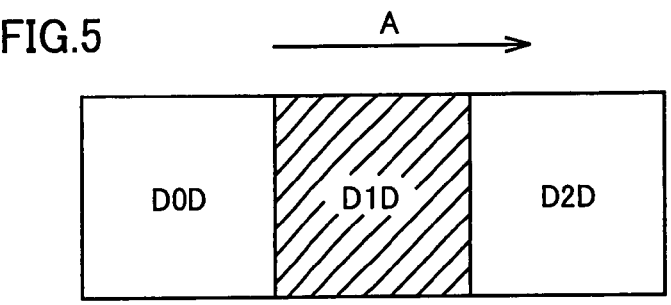

With reference to FIG. 5, specific description will be given of a method for generating a PWM printing position code in PWM printing position code generation unit 211 in a case that pixels are continuous in a main scanning direction. As shown in FIG. 5, a target pixel has a gradation value of D1D. Further, in a direction of an arrow A which is the main scanning direction, a pixel immediately preceding the target pixel has a gradation value of D0D and a pixel immediately following the target pixel has a gradation value of D2D. It is assumed herein that a ruled line contained in an original draft image is dark in color (e.g., black) on a background which is light in color (e.g., white).

With regard to the three pixels arranged in the main scanning direction such that the target pixel is sandwiched between the other two pixels, PWM printing position code generation unit 211 defines a relation in size among gradation values D0D, D1D and D2D. When such a relation among these gradation values is any of the following cases (A) to (E), a growth position is defined as follows.

(A) In case of D0D<D1D≦D2D, D1D is grown from D2D side.

(B) In case of D0D≦D1D<D2D, D1D is grown from D2D side.

(C) In case of D0D≧D1D>D2D, D1D is grown from D0D side.

(D) In case of D0D≧D1D>D2D, D1D is grown from D0D side.

(E) In case of D0D>D1D<D2D, D1D is grown from both D0D and D2D sides uniformly.

Figure 6:
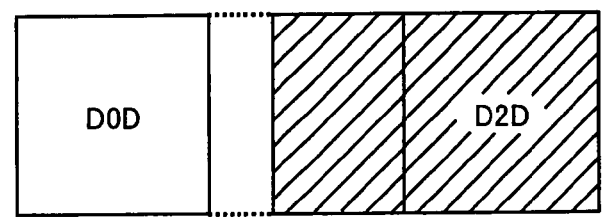
Figure 7:
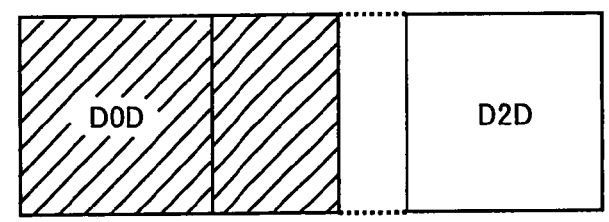
Figure 8:
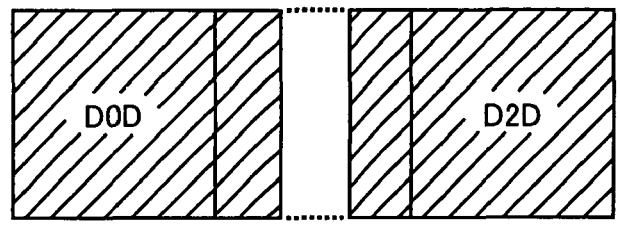

In other words, if the pixel immediately following the target pixel has a concentration higher than that of the target pixel (the aforementioned cases (A) and (B)), as shown in FIG. 6, PWM printing position code generation unit 211 defines a growth position such that a dot printing portion is expanded from a right side. If the pixel immediately preceding the target pixel has a concentration lower than that of the target pixel (the aforementioned cases (C) and (D)), as shown in FIG. 7, PWM printing position code generation unit 211 defines a growth position such that a dot printing portion is expanded from a left side. If the target pixel has a concentration lower than those of the other two pixels (the aforementioned case (E)), as shown in FIG. 8, PWM printing position code generation unit 211 defines a growth position such that a dot printing portion is expanded from both sides uniformly. Then, PWM printing position code generation unit 211 generates a PWM printing position code indicating a defined growth position, with regard to each pixel, and inputs the PWM printing position code to selector unit 213.

Selector unit 213 performs signal input operations on the basis of an edge signal inputted from edge signal output unit 215 and a PWM printing position code inputted from PWM printing position code generation unit 211. More specifically, with regard to a pixel which is detected as an edge, selector unit 213 inputs a PWM printing control signal for performing dot printing on a defined position to line width correction coefficient multiplication unit 111 on the basis of the PWM printing position code. On the other hand, with regard to a pixel which is not detected as an edge, selector unit 213 inputs a PWM printing control signal for regarding a dot printing portion as a central position of the pixel to line width correction coefficient multiplication unit 111 on the basis of a printing position code stored previously. Herein, the aforementioned printing position code stored previously will be referred to as a central printing position code.

With reference to FIG. 9, line width detection unit 105 includes a line width correction target attribute selection unit 301 selecting attribute data, which is a target of processing for correcting a line width, from attribute data of respective pixels in image data, an erosion processing unit 303 performing erosion processing on the attribute data to be processed, a first dilation processing unit 305 performing first dilation processing on a result of the processing, an inner line width output unit 307 detecting an inner line width (to be described later) from a result of the first dilation processing, and outputting the detected inner line width, a second dilation processing unit 309 performing second dilation processing on the result of the erosion processing, and an outer line width output unit 311 detecting an outer line width (to be described later) from a result of the second dilation processing, and outputting the detected outer line width.

Line width correction target attribute selection unit 301 analyzes inputted attribute data, and determines that each pixel is a text, a graphic or neither the pixel nor the graphic. As a result, line width correction target attribute selection unit 301 selects attribute data concerning a pixel determined as a text and a pixel determined as a ruled line (graphic), as attribute data which is a target of processing for correcting a line width, and inputs the selected attribute data to erosion processing unit 303. Erosion processing unit 303 performs erosion processing on each attribute data, which is inputted as data to be processed and corresponds to each pixel, through the use of one of a filter formed from a one by one matrix of pixels to a filter formed from an "n" by "n" matrix of pixels. A result of the erosion processing is subjected to first dilation processing and second dilation processing in first dilation processing unit 305 and second dilation processing unit 309, respectively. Each of the erosion processing in erosion processing unit 303, the dilation processing in first dilation processing unit 305 and the dilation processing in second dilation processing unit 309 is typical processing called close processing. Therefore, a specific method of the processing is not particularly limited in the present invention.

With reference to FIG. 10, as the first dilation processing, first dilation processing unit 305 performs dilation processing on a result of the processing in erosion processing unit 303 through the use of a filter having a size equal to that of the filter used in erosion processing unit 303. A result of the first dilation processing is inputted to inner line width output unit 307, and inner line width output unit 307 inputs an inner line width signal indicating an inner line width (to be described later) to AND calculation unit 107 on the basis of the result of the processing.

With reference to FIG. 11, as the second dilation processing, second dilation processing unit 309 performs dilation processing on the result of the processing in erosion processing unit 303 through the use of a filter having a size larger by two pixels than that of the filter used in erosion processing unit 303. A result of the second dilation processing is inputted to outer line width output unit 311, and outer line width output unit 311 inputs an outer line width signal indicating an outer line width (to be described later) to AND calculation unit 107 on the basis of the result of the processing.

When the first dilation processing unit 305 performs the first dilation processing on the result of the processing in erosion processing unit 303 through the use of the filter having a size equal to that of the filter used in erosion processing unit 303, a fine line which is not more than a filter size is eliminated, so that there is detected a black line BL having pixels which correspond to one pixel at both ends thereof as an edge pixel and are shown by portions E in FIG. 12. Then, there is detected a width LA of the black line containing the edge pixels at the both ends thereof each having a width DA corresponding to a width of one pixel. Herein, width LA of the black line containing the widths of the two edge pixels (DA×2) will be referred to as an inner line width.

When second dilation processing unit 309 performs the second dilation processing on the result of the processing in erosion processing unit 303 through the use of the filter having a size larger by two pixels than that of the filter used in erosion processing unit 303, there is detected a hollow line WH (hereinafter, referred to as a white line) which has pixels (portions E) corresponding to one pixel at both ends thereof as an edge pixel, with respect to a black background (portions BL) in FIG. 13. Then, there is detected a width LB of the white line containing the edge pixels at the both ends thereof each having a width DB (=DA) corresponding to a width of one pixel, that is, a line width larger by one pixel than an actual width of a white line at each of the both ends. Herein, width LB of the white line containing the widths of the two edge pixels (DB×2) will be referred to as an outer line width.

A maximum size value "n" of the filter used in first dilation processing unit 305 and second dilation processing unit 309 is not limited to a specific numeric value in the present invention, and may be set at an optional numeric value. The specific numeric value may be preferably about 6 to 8, more preferably 7. It is preferred that if a line width is larger than a filter size, first dilation processing unit 305 and second dilation processing unit 309 output an error signal indicating the fact such that the aforementioned processing is not performed on the line width larger than the filter size.

AND calculation unit 107 calculates an AND of an inner line width signal inputted from inner line width output unit 307 and an edge signal inputted from edge signal output unit 215 or calculates an AND of an outer line width signal inputted from outer line width output unit 311 and the edge signal inputted from edge signal output unit 215, so that a line width of an edge to be corrected is calculated.

The line width control processing (shown in a flowchart of FIG. 14) in image forming apparatus 1 according to the embodiment is realized in such a manner that CPU 11 of image forming apparatus 1 reads and executes the programs including the line width control program stored in storage unit 13 to control the respective units shown in FIG. 2.

With reference to FIG. 14, first, CPU 11 acquires original draft data obtained by scanning with image reader unit 19 or original draft data obtained in such a manner that NIC 15 receives data transmitted from another apparatus (step S101).

In the original draft data, attribute data is inputted from attribute data input unit 101 and a line width is detected by line width detection unit 105 (step S103), so that a line width signal is outputted.

In the original draft data, image data is inputted from image data input unit 103 and an edge is detected by edge detection unit 109 (step S105). In addition, a PWM position is determined by edge detection unit 109 (step S107), and a PWM printing control signal based on the determined PWM position is outputted from PWM printing control signal output unit 217.

AND calculation unit 107 calculates an AND of a line width signal outputted on the basis of the line width detected in step S105 and a PWM printing control signal outputted on the basis of the PWM position determined in step S107 (step S109), thereby to calculate a line width of the edge.

On the basis of the edge line width calculated in step S109, line width correction coefficient multiplication unit 111 acquires a coefficient corresponding to the line width from line width correction coefficients stored in coefficient storage unit 113 (step S111) and performs a multiplication on the line width, thereby to calculate a corrected line width (step S113).

CPU 11 performs image formation processing, so that a gradation of the pixel is replaced with a new gradation based on the corrected line width calculated in step S13. As a result, an image based on the image data in which a growth position of the pixel is determined is formed on the basis of a PWM printing control signal. The image data of the formed image is outputted to another apparatus through printer unit 21 or NIC 15 (step S115).

With reference to FIG. 15, next, description will be given of the line width detection processing in step S103. As shown in FIG. 15, first, line width correction target attribute selection unit 301 selects attribute data concerning a pixel determined as a text and attribute data concerning a pixel determined as a ruled line (graphic), as attribute data which is a target of processing for correcting a line width, from attribute data contained in original draft data (step S201).

Erosion processing unit 303 performs erosion processing on the attribute data selected in step S201 through the use of one of a filter formed from a one by one matrix of pixels to a filter formed from an "n" by "n" matrix of pixels (step S203). Further, first dilation processing unit 305 performs first dilation processing on a result of the processing through the use of a filter having a size equal to that of the filter used in erosion processing unit 303 (step S205). On the basis of a result of the first dilation processing in step S205, inner line width output unit 307 calculates an inner line width as described above, and outputs an inner line width signal indicating the inner line width (step S207).

Moreover, second dilation processing unit 309 performs second dilation processing on the result of the erosion processing in step S203 through the use of a filter having a size larger by two pixels than that of the filter used in step S203 (step S209). On the basis of a result of the second dilation processing in step S209, outer line width output unit 311 calculates an outer line width as described above, and outputs an outer line width signal indicating the outer line width (step S211).

It is to be noted that the processing in steps S205 to S207 and the processing in steps S209 to S211 are independent of each other; therefore, a procedure thereof is not limited to the aforementioned procedure and may be performed in a retrograde order.

The processing in steps S205 to S207 and the processing in steps S209 to S211 are performed on each attribute data selected in step S201. Upon completion of performance of processing on all pieces of attribute data selected in step S201 (YES in step S213), the processing proceeds to step S105.

With reference to FIG. 16, next, description will be given of the edge detection processing in step S105. As shown in FIG. 16, first, primary differential filter computation unit 201 performs a computation on image data contained in original draft data through the use of a primary differential filter (step S301). Then, secondary differential filter computation unit 203 performs a computation on the image data through the use of a secondary differential filter (step S303). The processing in step S301 and the processing in step S303 are independent of each other; therefore, a procedure thereof is not limited to the aforementioned procedure and may be performed in a retrograde order.

Next, edge extraction unit 205 extracts a pixel, which is an edge, from a result of the processing in step S301 and a result of processing in step S303 (step S305). Edge dilation unit 207 performs dilation processing on the edge pixel extracted in step S305 (step S307) and, further, edge erosion unit 209 performs erosion processing on a result of the processing (step S309).

The dilation processing in step S307 and the erosion processing in step S309 are performed on each pixel extracted as an edge in step S305. Upon completion of performance of processing for all pixels extracted as an edge in step S305 (YES in step S311), edge signal output unit 215 outputs an edge detection signal indicating an edge pixel (step S313) and the processing proceeds to step S107.

With reference to FIG. 17, next, description will be given of the PWM position determination processing in step S107. As shown in FIG. 17, first, PWM printing position code generation unit 211 generates a PWM printing position code as described above with regard to each pixel in image data contained in original draft data (step S401).

Next, selector unit 213 determines whether or not the pixel having the PWM printing position code generated in step S401 is a pixel extracted as an edge, on the basis of the edge signal outputted from edge signal output unit 215 in step S313 (step S403). As a result, if the pixel is determined as a pixel extracted as an edge (YES in step S403), PWM printing control signal output unit 217 outputs a PWM printing control signal based on the PWM printing position code generated in step S401 (step S405). If not (NO in step S403), PWM printing control signal output unit 217 outputs a PWM printing control signal based on a central printing position code as described above (step S407).

The processing in steps S401 to S407 is performed on all pixels in image data contained in the original draft data acquired in step S101. Upon completion of performance of processing for all pixels (YES in step S409), the processing proceeds to step S109.

It is assumed in this specific example that a PWM printing position code is generated with regard to all pixels contained in image data in step S401. However, a PWM printing position code may be generated with regard to only a pixel determined as an edge pixel through previous determination in step S403. That is, the processing procedure is not limited to the aforementioned order. Step S403 is performed prior to step S401 and, as a result of the determination, the PWM printing position code generation processing in step S401 may be performed.

The aforementioned processing performed by image forming apparatus 1 according to the embodiment makes it possible to replace a gradation by a line width correction coefficient and to narrow a line width in a case that an edge portion of a character or a ruled line has a predetermined thickness. Thus, it is possible to suppress a phenomenon that an edge portion of a character or a ruled line becomes thick, which is caused due to engine characteristics of image forming apparatus 1. Thus, it is possible to enhance reproducibility of a fine line. As a result, image forming apparatus 1 can form an image of high quality.

(First Modification)

As shown in FIG. 18, an image forming apparatus 1 according to a first modification includes a color detection unit 117 detecting a color from image data, in addition to the functions shown in FIG. 2. Color detection unit 117 detects a color for each pixel in image data, and inputs a color detection signal indicating the detected color to a line width correction coefficient multiplication unit 111. A method for detecting a color from image data in color detection unit 117 is not particularly limited to a specific method in the present invention, and an optional method can be adopted in the present invention.

As shown in FIG. 19, a coefficient storage unit 113 of image forming apparatus 1 according to the first modification stores a line width correction coefficient set for each color with respect to each of a 1-dot line width to an n-dot line width. It is to be noted that a specific numeric value of the coefficient in FIG. 19 is merely one specific example; therefore, the present invention is not limited thereto.

In image forming apparatus 1 according to the first modification, an edge detection unit 109 detects an edge from image data and color detection unit 117 detects a color for each pixel from the image data in step S105. In step S111, then, line width correction coefficient multiplication unit 111 acquires a line width correction coefficient on the basis of a line width of the edge calculated in step S109 and a color of the edge detected in step S105.

As one of engine characteristics, there is a case that expansion of a dot (enlargement of edge) differs for each color. Even in such a case, image forming apparatus 1 according to the first modification corrects a line width for each color through the use of a line width correction coefficient set for each color. Thus, it is possible to suppress a phenomenon that an edge portion of a character or a ruled line becomes thick due to the engine characteristics of image forming apparatus 1. Further, it is possible to enhance reproducibility of a fine line. As a result, image forming apparatus 1 can form an image of high quality.

(Second Modification)

According to a second modification, an image forming apparatus 1 acquires original draft data and, also, acquires a mode of an original draft and language information about the original draft.

The mode is information for specifying a type of an original draft, for example, for specifying that original draft data is document data, web data or CAD (Computer Aided Design) data. When an application which creates the original draft data issues a printing command, the mode may be automatically transmitted to image forming apparatus 1 together with the original draft data. Alternatively, when a user inputs the printing command through an operation panel 17, the mode may be inputted to image forming apparatus 1 together with the original draft data. The mode may be different from the original draft data or may be contained in the original draft data. Alternatively, the mode may be part of attribute data contained in the original draft data.

The language information is information representing a language of the original draft data. As in the case of the aforementioned mode, the language information may be acquired by image forming apparatus 1. The language information may be different from the original draft data or may be contained in the original draft data. Alternatively, the language data may be part of attribute data contained in the original draft data.

When the application which creates (changes or modifies) the original draft data issues a printing command to thereby transmit the original draft data to image forming apparatus 1, the mode or the language information of the original draft is created by a program (controller) for issuing a printing command to image forming apparatus 1 and is transmitted to image forming apparatus 1 together with the original draft data in accordance with execution of the program. Then, the mode and the language information are inputted to a line width correction coefficient multiplication unit 111.

As shown in FIG. 19, a coefficient storage unit 113 of image forming apparatus 1 according to the second modification stores a line width correction coefficient set for each mode of the original draft and a line width correction coefficient set for each language of the original draft with respect to each of a 1-dot line width to an n-dot line width. In step S111, line width correction coefficient multiplication unit 111 acquires a line width correction coefficient on the basis of a line width of an edge calculated in step S109 and the inputted mode or language information of the original draft.

As one of engine characteristics, there is a case that expansion of a dot (enlargement of edge) differs for each mode or language information of the original draft. Even in such a case, image forming apparatus 1 according to the second modification corrects a line width through the use of a line width correction coefficient set for each mode or language information of the original draft. Thus, it is possible to suppress a phenomenon that an edge portion of a character or a ruled line becomes thick due to the engine characteristics of image forming apparatus 1. Further, it is possible to enhance reproducibility of a fine line. As a result, image forming apparatus 1 can form an image of high quality.

The present invention can further provide a program for allowing a computer to execute the line width control according to the aforementioned embodiment. Such a program may be provided as a program product while being recorded in a computer readable recording medium such as a flexible disk attached to the computer, a CD-ROM (Compact Disk-Read Only Memory), a ROM (Read Only Memory), a RAM (Random Access Memory) or a memory card. Alternatively, the program may be provided while being recorded in a recording medium such as a hard disk in the computer. Still alternatively, the program may be provided through a download on a network.

The program according to the present invention may call a required module from among program modules provided as part of an OS (Operating System) of the computer in a predetermined arrangement at a predetermined timing, thereby to perform processing. In such a case, the program itself includes no module; therefore, the processing is performed in cooperation with the OS. The program including no module is also subsumed under the program according to the present invention.

The program according to the present invention may be provided while being incorporated in part of another program. In such a case, the program itself includes no module; therefore, the processing is performed in cooperation with another program including a module. The program incorporated in another program is also subsumed under the program according to the present invention.

A program product to be provided is executed while being installed in a program storage unit such as a hard disk. Herein, the program product includes a program itself and a recording medium having the program recorded therein.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a line width detection unit for detecting a width of a line contained in image data from attribute data corresponding to said image data;
   an edge detection unit for detecting an edge pixel from said image data;
   a storage unit for storing a plurality of line width correction coefficients, each corresponding to a respective line width; and a correction unit for acquiring a line width correction coefficient corresponding to a line width detected by said line width detection unit from said storage unit with regard to said edge pixel, and correcting a gradation of said edge pixel by multiplying said line width and said line width correction coefficient, thereby correcting said line width, wherein said line width detection unit includes:
  an erosion processing unit for performing erosion processing on said attribute data through the use of one of a filter formed from a one by one matrix of pixels to a filter formed from an "n" by "n" matrix of pixels;
  a first dilation processing unit for performing dilation processing on said erosion processing using the filter formed from each matrix of pixels through the use of a filter having a size equal to that of the filter used in said erosion processing;
  a second dilation processing unit for performing dilation processing on said erosion processing using the filter formed from each matrix of pixels through the use of a filter having a size larger by two pixels than that of the filter used in said erosion processing; and
  a line width output unit for outputting a first line width as a result of the processing in said first dilation processing unit and a second line width as a result of the processing in said second dilation processing unit.

2. The image forming apparatus according to claim 1, wherein
  the size of said filter used in said erosion processing has an optionally settable maximum value "n", and
  when said line width is larger than said maximum value "n", said erosion processing unit performs no erosion processing.

3. The image forming apparatus according to claim 1, wherein
  said edge detection unit includes:
  a primary differential computation unit for performing a primary differentiation on said image data;
  a secondary differential computation unit for performing a secondary differentiation on said image data;
  an edge dilation processing unit for performing dilation processing on an AND of a result of said primary differentiation and a result of said secondary differentiation;
  an edge erosion processing unit for performing erosion processing on a result of said dilation processing;
  a generation unit for generating, with regard to one pixel of said image data, a pulse width modulation (PWM) printing position code indicating that growth of a printing dot is started from which one of pixels each adjoining to the relevant pixel in a main scanning direction, on the basis of a difference in gradation between the relevant pixel and the pixels each adjoining thereto; and
  a selection unit for selecting a code controlling a printing pulse output position in said pixel, from said PWM printing position code generated by said generation unit and a central printing position code indicating that the printing pulse output position of said pixel is regarded as a center of the pixel, on the basis of a result of said erosion processing.

4. The image forming apparatus according to claim 1, further comprising:
  a color detection unit for detecting a color of said line from said image data, wherein
  said storage unit stores a line width correction coefficient corresponding to a line width for each color, and
  said correction unit acquires a line width correction coefficient, corresponding to the line width detected by said line width detection unit and the color detected by said color detection unit, from said storage unit with regard to said edge pixel, and corrects the gradation of said edge pixel through the use of said line width and said line width correction coefficient, thereby to correct said line width.

5. The image forming apparatus according to claim 1, wherein
  said storage unit stores a line width correction coefficient corresponding to a line width for each mode and/or language of said image data, and
  said correction unit acquires a line width correction coefficient, corresponding to the line width detected by said line width detection unit and the mode and/or language of said image data, from said storage unit with regard to said edge pixel, and corrects the gradation of said edge pixel through the use of said line width and said line width correction coefficient, thereby to correct said line width.

6. A line width control method for controlling a width of a line contained in an image formed by an image forming apparatus including a storage unit for storing a plurality of line width correction coefficients, each corresponding to a respective line width, the line width control method comprising:
  an acquisition step of acquiring image data and attribute data corresponding to said image data in said image forming apparatus;
  a line width detection step of detecting a width of a line contained in said image data from said attribute data;
  an edge detection step of detecting an edge pixel from said image data; and
  a correction step of acquiring a line width correction coefficient, corresponding to said line width detected in said line width detection step, from said storage unit with regard to said edge pixel, and correcting a gradation of said edge pixel by multiplying said line width and said line width correction coefficient, thereby correcting said line width, wherein said line width detection step includes:
    an erosion processing step of performing erosion processing on said attribute data through the use of one of a filter formed from a one by one matrix of pixels to a filter formed from an "n" by "n" matrix of pixels;
    a first dilation processing step of performing dilation processing on said erosion processing using the filter formed from each matrix of pixels through the use of a filter having a size equal to that of the filter used in said erosion processing;
    a second dilation processing step of performing dilation processing on said erosion processing using the filter formed from each matrix of pixels through the use of a filter having a size larger by two pixels than that of the filter used in said erosion processing; and
    a line width output step of outputting a first line width as a result of the processing in said first dilation processing step, and a second line width as a result of the processing in said second dilation processing step.

7. The line width control method according to claim 6, wherein
  the size of said filter used in said erosion processing has an optionally settable maximum value "n", and
  when said line width is larger than said maximum value "n", said erosion processing step performs no erosion processing.

8. The line width control method according to claim 6, wherein said edge detection step includes:
a primary differential computation step of performing a primary differentiation on said image data;
a secondary differential computation step of performing a secondary differentiation on said image data;
an edge extraction step of calculating an AND of a result of said primary differentiation and a result of said secondary differentiation, thereby extracting an edge pixel from said image data;
an edge dilation processing step of performing dilation processing on the AND of the result of said primary differentiation and the result of said secondary differentiation with regard to a pixel extracted as said edge pixel;
an edge erosion processing step of performing erosion processing on a result of said dilation processing;
a generation step of generating, with regard to one pixel of said image data, a pulse width modulation (PWM) printing position code indicating that growth of a printing dot is started from which one of pixels each adjoining to the relevant pixel in a main scanning direction, on the basis of a difference in gradation between the relevant pixel and the pixels each adjoining thereto;
a first output step of outputting said PWM printing position code generated in said generation step, as a code controlling a printing pulse output position in said pixel, when said pixel is detected as an edge pixel on the basis of a result of said erosion processing; and
a second output step of outputting a central printing position code indicating that the printing pulse output position of said pixel is regarded as a center of the pixel, as the code controlling the printing pulse output position in said pixel, when said pixel is not detected as an edge pixel on the basis of the result of said erosion processing.

9. The line width control method according to claim 6, wherein
said storage unit stores a line width correction coefficient corresponding to a line width for each color,
the line width control method further comprises a color detection step of detecting a color of said line from said image data, and
said correction step acquires a line width correction coefficient, corresponding to the line width detected in said line width detection step and the color detected in said color detection step, from said storage unit with regard to said edge pixel, and corrects the gradation of said edge pixel through the use of said line width and said line width correction coefficient, thereby to correct said line width.

10. The line width control method according to claim 6, wherein
said storage unit stores a line width correction coefficient corresponding to a line width for each mode and/or language of said image data, and
said correction step acquires a line width correction coefficient, corresponding to the line width detected in said line width detection step and the mode and/or language of said image data, from said storage unit with regard to said edge pixel, and corrects the gradation of said edge pixel through the use of said line width and said line width correction coefficient, thereby to correct said line width.

11. A line width control program product embodied in a non-transitory computer readable medium for allowing a computer to execute processing for controlling a width of a line contained in an image formed, the line width control program product embodied in a computer readable medium comprising:

an acquisition step of acquiring image data and attribute data corresponding to said image data;
a line width detection step of detecting a width of a line contained in said image data from said attribute data;
an edge detection step of detecting an edge pixel from said image data; and
a correction step of acquiring a line width correction coefficient, corresponding to said line width detected in said line width detection step, from a storage unit storing a plurality of line width correction coefficients, each corresponding to a respective line width, with regard to said edge pixel, and correcting a gradation of said edge pixel by multiplying said line width and said line width correction coefficient, thereby correcting said line width,
wherein said line width detection step includes:
an erosion processing step of performing erosion processing on said attribute data through the use of one of a filter formed from a one by one matrix of pixels to a filter formed from an "n" by "n" matrix of pixels;
a first dilation processing step of performing dilation processing on said erosion processing using the filter formed from each matrix of pixels through the use of a filter having a size equal to that of the filter used in said erosion processing;
a second dilation processing step of performing dilation processing on said erosion processing using the filter formed from each matrix of pixels through the use of a filter having a size larger by two pixels than that of the filter used in said erosion processing; and
a line width output step of outputting a first line width as a result of the processing in said first dilation processing step, and a second line width as a result of the processing in said second dilation processing step.

12. The line width control program product embodied in a non-transitory computer readable medium according to claim 11, wherein
the size of said filter used in said erosion processing has an optionally settable maximum value "n", and
when said line width is larger than said maximum value "n", said erosion processing step performs no erosion processing.

13. The line width control program product embodied in a non-transitory computer readable medium according to claim 11, wherein
said edge detection step includes:
a primary differential computation step of performing a primary differentiation on said image data;
a secondary differential computation step of performing a secondary differentiation on said image data;
an edge extraction step of calculating an AND of a result of said primary differentiation and a result of said secondary differentiation, thereby extracting an edge pixel from said image data;
an edge dilation processing step of performing dilation processing on the AND of the result of said primary differentiation and the result of said secondary differentiation with regard to a pixel extracted as said edge pixel;
an edge erosion processing step of performing erosion processing on a result of said dilation processing;
a generation step of generating, with regard to one pixel of said image data, a pulse width modulation (PWM) printing position code indicating that growth of a printing dot is started from which one of pixels each adjoining to the relevant pixel in a main scanning direction, on the basis of a difference in gradation between the relevant pixel and the pixels each adjoining thereto;

a first output step of outputting said PWM printing position code generated in said generation step, as a code controlling a printing pulse output position in said pixel, when said pixel is detected as an edge pixel on the basis of a result of said erosion processing; and a second output step of outputting a central printing position code indicating that the printing pulse output position of said pixel is regarded as a center of the pixel, as the code controlling the printing pulse output position in said pixel, when said pixel is not detected as an edge pixel on the basis of the result of said erosion processing.

14. The line width control program product embodied in a non-transitory computer readable medium according to claim 11, wherein said storage unit stores a line width correction coefficient corresponding to a line width for each color, the line width control program product embodied in a computer readable medium further comprises a color detection step of detecting a color of said line from said image data, and said correction step acquires a line width correction coefficient, corresponding to the line width detected in said line width detection step and the color detected in said color detection step, from said storage unit with regard to said edge pixel, and corrects the gradation of said edge pixel through the use of said line width and said line width correction coefficient, thereby to correct said line width.

15. The line width control program product embodied in a non-transitory computer readable medium according to claim 11, wherein said storage unit stores a line width correction coefficient corresponding to a line width for each mode and/or language of said image data, and said correction step acquires a line width correction coefficient, corresponding to the line width detected in said line width detection step and the mode and/or language of said image data, from said storage unit with regard to said edge pixel, and corrects the gradation of said edge pixel through the use of said line width and said line width correction coefficient, thereby to correct said line width.

16. An image forming apparatus comprising:

a line width detection unit, for detecting a width of a line contained in image data from attribute data corresponding to said image data;

an edge detection unit for detecting an edge pixel from said image data;

a storage unit for storing a plurality of line width correction coefficients, each corresponding to a respective line width; and a correction unit for acquiring a line width correction coefficient corresponding to a line width detected by said line width detection unit from said storage unit with regard to said edge pixel, and correcting a gradation of said edge pixel by multiplying said line width and said line width correction coefficient, thereby correcting said line width, wherein said edge detection unit includes:

a primary differential computation unit for performing a primary differentiation on said image data;

a secondary differential computation unit for performing a secondary differentiation on said image data;

an edge dilation processing unit for performing dilation processing on an AND of a result of said primary differentiation and a result of said secondary differentiation;

an edge erosion processing unit for performing erosion processing on a result of said dilation processing;

a generation unit for generating, with regard to one pixel of said image data, a pulse width modulation (PWM) printing position code indicating that growth of a printing dot is started from which one of pixels each adjoining to the relevant pixel in a main scanning direction, on the basis of a difference in gradation between the relevant pixel and the pixels each adjoining thereto; and a selection unit for selecting a code controlling a printing pulse output position in said pixel, from said PWM printing position code generated by said generation unit and a central printing position code indicating that the printing pulse output position of said pixel is regarded as a center of the pixel, on the basis of a result of said erosion processing.

17. The image forming apparatus according to claim 16, wherein said line width detection unit includes:

an erosion processing unit for performing erosion processing on said attribute data through the use of one of a filter formed from a one by one matrix of pixels to a filter formed from an "n" by "n" matrix of pixels;

a first dilation processing unit for performing dilation processing on said erosion processing using the filter formed from each matrix of pixels through the use of a filter having a size equal to that of the filter used in said erosion processing;

a second dilation processing unit for performing dilation processing on said erosion processing using the filter formed from each matrix of pixels through the use of a filter having a size larger by two pixels than that of the filter used in said erosion processing; and a line width output unit for outputting a first line width as a result of the processing in said first dilation processing unit and a second line width as a result of the processing in said second dilation processing unit.

18. The image forming apparatus according to claim 16, further comprising:

a color detection unit for detecting a color of said line from said image data, wherein said storage unit stores a line width correction coefficient corresponding to a line width for each color, and said correction unit acquires a line width correction coefficient, corresponding to the line width detected by said line width detection unit and the color detected by said color detection unit, from said storage unit with regard to said edge pixel, and corrects the gradation of said edge pixel through the use of said line width and said line width correction coefficient, thereby to correct said line width.

19. The image forming apparatus according to claim 16, wherein said storage unit stores a line width correction coefficient corresponding to a line width for each mode and/or language of said image data, and said correction unit acquires a line width correction coefficient, corresponding to the line width detected by said line width detection unit and the mode and/or language of said image data, from said storage unit with regard to said edge pixel, and corrects the gradation of said edge pixel through the use of said line width and said line width correction coefficient, thereby to correct said line width.

20. A line width control method for controlling a width of a line contained in an image formed by an image forming apparatus including a storage unit for storing a plurality of line width correction coefficients, each corresponding to a respective line width, the line width control method comprising:

an acquisition step of acquiring image data and attribute data corresponding to said image data in said image forming apparatus;

a line width detection step of detecting a width of a line contained in said image data from said attribute data;

an edge detection step of detecting an edge pixel from said image data; and a correction step of acquiring a line width correction coefficient, corresponding to said line width detected in said line width detection step, from said storage unit with regard to said edge pixel, and correcting a gradation of said edge pixel by multiplying said line width and said line width correction coefficient, thereby correcting said line width, wherein said edge detection step includes:

a primary differential computation step of performing a primary differentiation on said image data;

a secondary differential computation step of performing a secondary differentiation on said image data;

an edge extraction step of calculating an AND of a result of said primary differentiation and a result of said secondary differentiation, thereby extracting an edge pixel from said image data;

an edge dilation processing step of performing dilation processing on the AND of the result of said primary differentiation and the result of said secondary differentiation with regard to a pixel extracted as said edge pixel;

an edge erosion processing step of performing erosion processing on a result of said dilation processing;

a generation step of generating, with regard to one pixel of said image data, a pulse width modulation (PWM) printing position code indicating that growth of a printing dot is started from which one of pixels each adjoining to the relevant pixel in a main scanning direction, on the basis of a difference in gradation between the relevant pixel and the pixels each adjoining thereto;

a first output step of outputting said PWM printing position code generated in said generation step, as a code controlling a printing pulse output position in said pixel, when said pixel is detected as an edge pixel on the basis of a result of said erosion processing; and a second output step of outputting a central printing position code indicating that the printing pulse output position of said pixel is regarded as a center of the pixel, as the code controlling the printing pulse output position in said pixel, when said pixel is not detected as an edge pixel on the basis of the result of said erosion processing.

21. A line width control program product embodied in a non-transitory computer readable medium for allowing a computer to execute processing for controlling a width of a line contained in an image formed, the line width control program product embodied in a computer readable medium comprising:

an acquisition step of acquiring image data and attribute data corresponding to said image data;

a line width detection step of detecting a width of a line contained in said image data from said attribute data;

an edge detection step of detecting an edge pixel from said image data; and a correction step of acquiring a line width correction coefficient, corresponding to said line width detected in said line width detection step, from a storage unit storing a plurality of line width correction coefficients, each corresponding to a respective line width, with regard to said edge pixel, and correcting a gradation of said edge pixel by multiplying said line width and said line width correction coefficient, thereby correcting said line width, wherein said edge detection step includes:

a primary differential computation step of performing a primary differentiation on said image data;

a secondary differential computation step of performing a secondary differentiation on said image data;

an edge extraction step of calculating an AND of a result of said primary differentiation and a result of said secondary differentiation, thereby extracting an edge pixel from said image data;

an edge dilation processing step of performing dilation processing on the AND of the result of said primary differentiation and the result of said secondary differentiation with regard to a pixel extracted as said edge pixel;

an edge erosion processing step of performing erosion processing on a result of said dilation processing;

a generation step of generating, with regard to one pixel of said image data, a pulse width modulation (PWM) printing position code indicating that growth of a printing dot is started from which one of pixels each adjoining to the relevant pixel in a main scanning direction, on the basis of a difference in gradation between the relevant pixel and the pixels each adjoining thereto;

a first output step of outputting said PWM printing position code generated in said generation step, as a code controlling a printing pulse output position in said pixel, when said pixel is detected as an edge pixel on the basis of a result of said erosion processing; and a second output step of outputting a central printing position code indicating that the printing pulse output position of said pixel is regarded as a center of the pixel, as the code controlling the printing pulse output position in said pixel, when said pixel is not detected as an edge pixel on the basis of the result of said erosion processing.

\* \* \* \* \*